P. FORG.
VALVE HANDLE.
APPLICATION FILED SEPT. 13, 1915.
1,218,753.
Patented Mar. 13, 1917
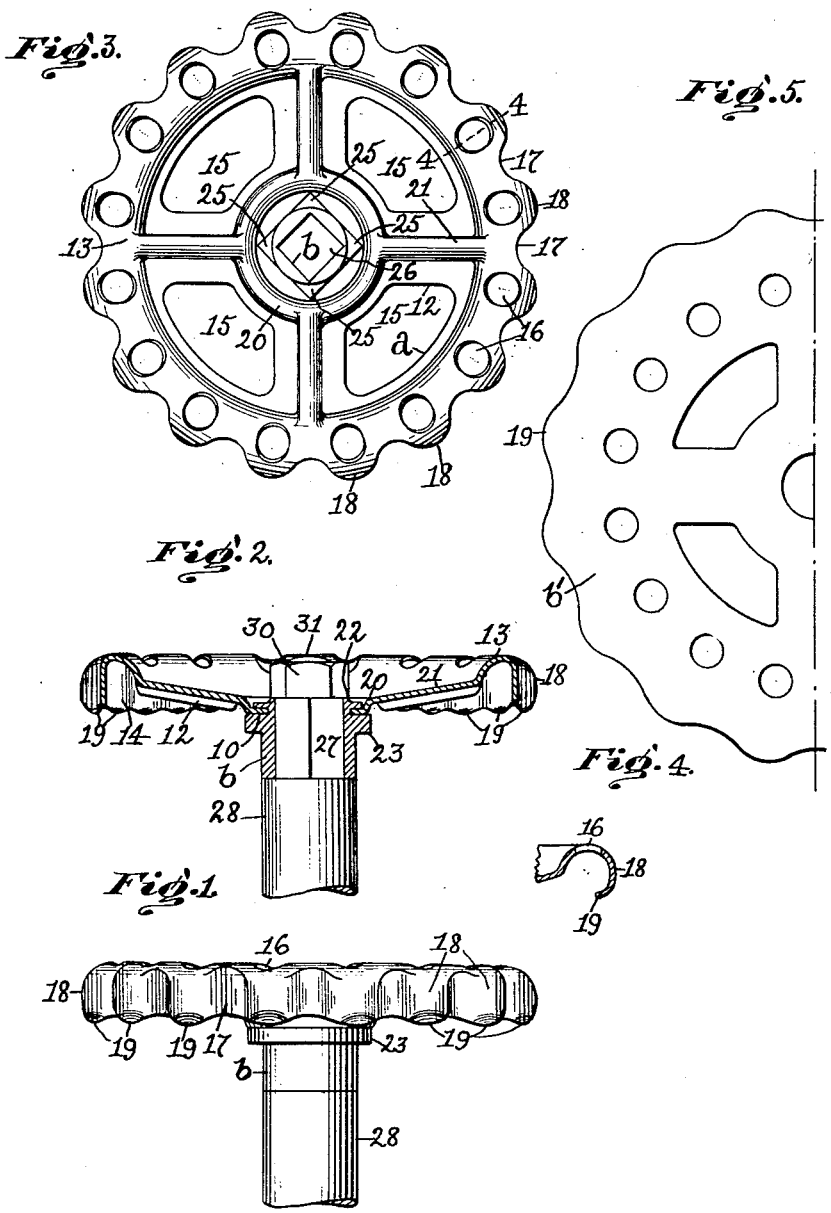
Inventor:
Peter Forg
by Jas. H. Churchill
Atty.

UNITED STATES PATENT OFFICE.

PETER FORG, OF SOMERVILLE, MASSACHUSETTS.

VALVE-HANDLE.

1,218,753.

Specification of Letters Patent. Patented Mar. 13, 1917.

Application filed September 13, 1915. Serial No. 50,286.

*To all whom it may concern:*

Be it known that I, PETER FORG, a citizen of the United States, residing in Somerville, in the county of Middlesex and State of Massachusetts, have invented an Improvement in Valve-Handles, of which the following description, in connection with the accompanying drawings, is a specification, like characters on the drawings representing like parts.

This invention relates to a valve handle, and has for its object to provide a superior metal handle which is strong, light, attractive, inexpensive, and capable of being fitted to valve stems of various sizes, and with which a firm grip of the hand may be obtained.

To this end, the handle is composed of a sheet metal disk member, which can be struck up from sheet metal, and a bushing member preferably of malleable iron which is firmly secured to the disk member as will be described.

The particular features of the invention will be pointed out in the claims at the end of this specification.

Figure 1 is an elevation of a portion of a valve stem provided with a handle embodying this invention.

Fig. 2, a similar view with the handle in section.

Fig. 3, a plan of the handle removed from the stem.

Fig. 4, a section on the line 4—4, Fig. 3, and

Fig. 5, a detail of a portion of the blank from which the handle is formed.

Referring to the drawing $a$ represents the metal disk member and $b$ the bushing, of a valve handle embodying this invention.

The disk member $a$ is made from a flat sheet metal blank $b'$, such as thin sheet steel, which is pressed by suitable dies from the flat condition shown in Fig. 4 to form a substantially flat central portion 10, connected preferably by upwardly inclined arms 12 with an annular rim 13, provided with a depending annular flange 14. The central portion 10 is provided with an angular opening for the reception of the upper end of the bushing $b$, and the inclined arms 12 are separated by openings 15, which serve to materially lighten the handle without sacrificing the strength thereof, and the rim 13 is provided with a series of holes 16, which are arranged in substantially close proximity and serve to lighten the weight of the handle and also afford ports for the circulation of air, which acts to conduct away heat and keep the rim substantially cool, so that it can be handled without danger of burning the hand of the operator, especially when the handle is used on steam valves. The flange 14 is provided with a series of corrugations comprising valleys 17 and raised portions 18, which latter are made longer than the valleys to form holding projections 19, which are bent or curved inwardly, see Fig. 4, to provide the flange on its underside with a plurality of smooth gripping surfaces for engagement by the fingers of the operator, without danger of the fingers being cut or otherwise injured especially when the flange is gripped firmly while in the act of turning the handle. The added length on the raised portions of the corrugations is provided for in the blank $b$ by the extensions or projections marked 19. The portion of the handle within the rim 13 may and preferably will be provided with corrugations to strengthen the same, and it is preferred to provide the substantially flat central portion 10 with an annular corrugation 20, and the arms 12 with substantially central corrugations 21, which extend from the annular corrugation 20 into the rim 13. The bushing $b$ is preferably made of malleable iron and is provided with the reduced angular upper portion 22, and with an annular flange or collar 23, which forms a shoulder for the central portion 10 of the handle to rest upon, and said reduced portion 22 is provided with ears 25, see Fig. 3, which are formed by compressing the reduced portion 22 at the corners of the same so as to overlap and engage the upper surface of the central portion 10, and clamp the latter between them and the collar 23, thereby firmly securing the handle to the bushing to turn therewith.

The bushing $b$ is provided with an opening or bore 26 which is angular in cross section and preferably square, so as to fit onto the square or angular end 27 of the valve stem 28, which latter may be cylindrical or of other shape in cross section and such as now commonly used.

The handle $a$ may be secured to the valve stem in the usual manner by a nut 30 which engages the threaded end 31 of the stem. The bushing $b$ being separate from the handle, enables the latter to be used with valve stems of various sizes, as the bushings can be provided with bores of various areas in cross section to fit any desired size of valve stem within limits, so that the sheet metal handle proper can be used as a standard for a variety of sizes of valve stems.

It is preferred to connect the central portion 10 with the rim 13 by the arms 12, but it is not desired to limit the invention in this respect.

Claims:

1. In a handle of the character described, in combination, a sheet metal disk member provided with a central portion having an opening, arms extended from said central portion, an annular rim connected with said central portion by said arms, an annular flange depending from said rim and provided with corrugations comprising valleys and raised portions of greater length than said valleys and having inwardly bent end portions to form a plurality of smooth gripping surfaces on the underside of said rim, and a bushing having a reduced portion extended through the opening in said central portion, and means on said bushing for securing the handle to the bushing.

2. In a handle of the character described, in combination, a sheet metal disk member provided with a central portion having an opening and having an annular corrugation external to said opening, arms extended from said central portion and provided with corrugations extended lengthwise of said arms, an annular rim connected with said central portion by said corrugated arms, a corrugated annular flange extended from said rim and provided with raised portions having inwardly bent end portions, which form smooth gripping projections on the under surface of said flange, and a bushing having a portion extended through the opening in said central portion and secured to the latter.

3. In a handle of the character described, a sheet metal disk member provided with a central portion having an opening, an annular rim connected with said central portion and provided with an annular flange having corrugations comprising valleys and raised portions of greater length than said valleys and provided with inwardly bent ends to form smooth gripping surfaces on the under side of said flange.

4. In a handle of the character described, a sheet metal disk member provided with a central portion having an opening, an annular rim connected with said central portion and provided with a corrugated flange, the raised portions of the corrugations of said flange being longer than the valleys thereof and bent inwardly to form smooth gripping surfaces on the underside of said flange.

In testimony whereof, I have signed my name to this specification.

PETER FORG.